US008714282B2

(12) United States Patent
Chen et al.

(10) Patent No.: US 8,714,282 B2
(45) Date of Patent: May 6, 2014

(54) HAND-HELD POWER TOOL

(75) Inventors: Ross Chen, Shanghai (CN); Rony Meier, Mauren (LI); Tobias Grieger, Kressbronn (DE); Valentin Keller, Augsburg (DE); Bastian Roll, Landsberg (DE)

(73) Assignee: Hilti Aktiengesellschaft, Schaan (LI)

(*) Notice: Subject to any disclaimer, the term of this patent is extended or adjusted under 35 U.S.C. 154(b) by 0 days.

(21) Appl. No.: 13/041,673

(22) Filed: Mar. 7, 2011

(65) Prior Publication Data

US 2011/0297409 A1 Dec. 8, 2011

(30) Foreign Application Priority Data

Mar. 8, 2010 (EP) .................................... 10155791

(51) Int. Cl.

*B23B 45/00* (2006.01)
*E21B 3/00* (2006.01)
*E21B 17/22* (2006.01)
*E21B 19/16* (2006.01)
*E21B 19/18* (2006.01)

(52) U.S. Cl.
USPC ........................................... 173/217; 173/170

(58) Field of Classification Search
USPC .................................................. 173/217, 170
See application file for complete search history.

(56) References Cited

U.S. PATENT DOCUMENTS 2,712,765 A * 7/1955 Knight, Jr. ..................... 81/58.3
4,066,133 A * 1/1978 Voss ............................. 173/182
4,448,098 A * 5/1984 Totsu ............................. 81/467
4,739,838 A * 4/1988 Marks ........................... 173/170
D303,204 S * 9/1989 Marks ............................. D8/51
4,950,013 A * 8/1990 Yonkers .......................... 294/49
D353,526 S * 12/1994 Hoshino .......................... D8/68
5,588,903 A * 12/1996 Pennison ...................... 451/344
5,598,892 A * 2/1997 Fox .............................. 173/170
D387,263 S * 12/1997 Bidstrup et al. ................. D8/97
5,692,574 A * 12/1997 Terada ....................... 173/162.2
5,697,456 A * 12/1997 Radle et al. ................ 173/162.2
D396,624 S * 8/1998 Basilius ......................... D8/107
D412,273 S * 7/1999 Chung ............................. D8/62
6,479,918 B1 * 11/2002 Burger et al. ................. 310/241
6,858,286 B1 * 2/2005 Simm et al. ................... 428/182
D507,952 S * 8/2005 Wu ................................. D8/68
7,096,974 B2 * 8/2006 Obermeier et al. ........... 173/217
7,397,153 B2 * 7/2008 Buck et al. ....................... 310/50
7,401,663 B2 * 7/2008 Craven et al. ................. 173/217
8,261,852 B2 * 9/2012 Miyazawa et al. ............ 173/170
8,261,853 B2 * 9/2012 Hachisuka .................... 173/170
8,267,192 B2 * 9/2012 Lopano et al. ................ 173/170
2003/0094294 A1 * 5/2003 Fritz ............................ 173/171
2003/0146008 A1 * 8/2003 Andriolo ....................... 173/217
2004/0187322 A2 * 9/2004 Bednar et al. ................... 30/392
2004/0231170 A1 * 11/2004 Neitzell et al. .................. 30/340
2010/0012339 A1 * 1/2010 Hahn et al. ................. 173/162.2
2011/0114345 A1 * 5/2011 Schlesak et al. .................. 173/1
2011/0120741 A1 * 5/2011 Limberg et al. ............... 173/170

* cited by examiner

*Primary Examiner* — Robert Long
(74) *Attorney, Agent, or Firm* — Crowell & Moring LLP

(57) ABSTRACT

A hand-held power tool is disclosed. The power tool has a tool receptacle for holding a tool along an axis. A housing has a grip area for a first hand. The grip area has a support section for the thumb and index finger in a plane with the axis and a shaft section for gripping around on one side of the plane. A contact surface for a second hand, which is arranged facing away from the tool receptacle and on another side of the plane, is inclined between 80 degrees and 100 degrees to the plane.

3 Claims, 1 Drawing Sheet

HAND-HELD POWER TOOL

This application claims the priority of European Patent Document No. 10155791.6, filed Mar. 8, 2010, the disclosure of which is expressly incorporated by reference herein.

BACKGROUND AND SUMMARY OF THE INVENTION

The present invention relates to a hand-held power tool, in particular an electric screwdriver.

In most applications, electric screwdrivers may be guided with one hand. The torque and contact pressure to be applied by the user are typically low. A pistol grip is adequate for these applications and allows for a compact and simple design. In individual application cases, e.g., when fastening sheet metal using screws, a higher contact pressure is required. For these types of applications, the user may hold the electric screwdriver with his other hand on a detachable additional handgrip that the user can fasten near the tool receptacle.

The hand-held power tool according to the invention, e.g., an electric screwdriver, has a tool receptacle for holding a tool along an axis. A housing has a grip area for a first hand. The grip area has a support section for the thumb and index finger in a plane with the axis and a shaft section for gripping around on one side of the plane. A contact surface for a second hand, which is arranged facing away from the tool receptacle and on another side of the plane, is inclined between 80 degrees and 100 degrees to the plane.

The contact surface makes it possible for a user to exert an additional contact pressure on the tool, e.g., in which the ball of the second hand presses against the contact surface. Although it is possible to initiate greater force with the ball of the hand than with the hand span between the thumb and index finger, studies surprisingly showed that the arrangement of the contact surface offset from the axis and the grip area for the hand span in the plane with the axis is perceived to be more ergonomic in the case of long usage. The selected inclination prevents the hand from slipping off the device or the second hand from slipping against the first hand.

One embodiment provides that the contact surface has a dimension of at least 1.2 cm perpendicular to the plane.

One embodiment provides for the support section for the thumb and index finger to be arranged in a recess of the housing.

The following description explains the invention on the basis of exemplary embodiments and figures.

DETAILED DESCRIPTION OF THE DRAWINGS

Unless otherwise indicated, the same or functionally equivalent elements are indicated by the same reference numbers in the figures.

Figure 1:
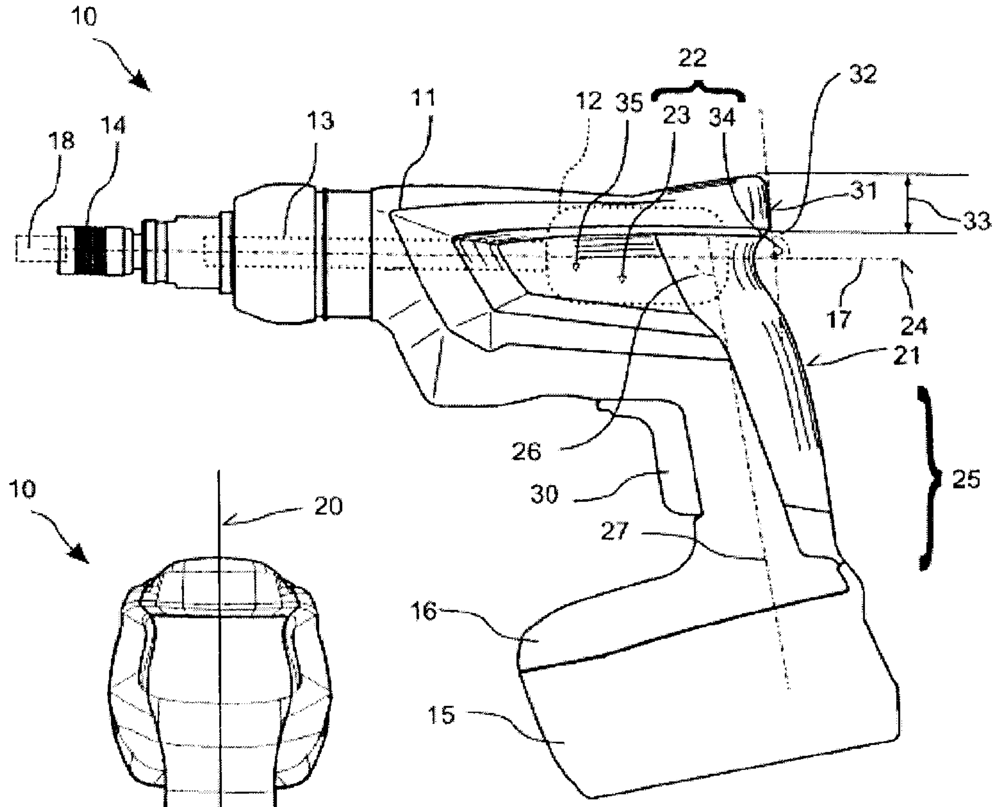
FIG. 1 illustrates an electric screwdriver in accordance with the principles of the present invention.
Figure 2:
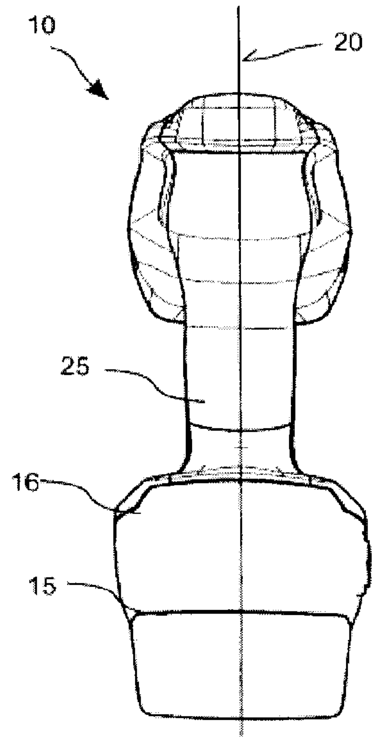
FIG. 2 is a cross-section through the electric screwdriver of FIG. 1.

FIG. 1 shows a side view of an electric screwdriver 10 as an example of a hand-held power tool. FIG. 2 shows a cross-section through the screwdriver. The electric screwdriver 10 has an angled housing 11, in which a motor 12 is coupled to a tool receptacle 14 by a drive train 13. The drive train 13 may include, for example, at least a spindle, a gear, an overload clutch, a tangential striking mechanism, etc. A power supply for the electric screwdriver 10, in particular for the motor 12, is provided by an accumulator 15, which is fastened detachably on a base 16 of the housing 11.

The tool receptacle 14 establishes a working axis 17 of the electric screwdriver 10, in that it aligns a tool 18 along the working axis 17. The user exerts a contact pressure along the working axis 17 in order to screw a screw into a work piece.

The housing 11 is essentially mirror-symmetrical to a plane of symmetry 20 in which the working axis 17 runs. A user may operate the electric screwdriver 10 in equal measure with the left hand or the right hand.

A user may position a guiding hand on a rear side 21 of the housing 11 facing away from the tool receptacle 14. The thumb and index finger rest laterally against the housing 11 on both sides of the plane of symmetry 20 in a support area 22. The support area 22 begins at the rear side 21 of the housing 11 and has two legs 23, which run in the direction towards the tool receptacle 14 and surround the housing 11 in a U-shaped manner between each other. The legs 23 of the support area 22 define a guidance plane 24, in which the working axis 17 also lies and which is perpendicular to the plane of symmetry 20. The legs 23 are approximately as long as an index finger.

The angled housing 11 has a shaft 25 inclined toward the working axis 17. An inclination 26 of a longitudinal axis 27 of the shaft 25 to the working axis 17 may lie between 70 degrees and 90 degrees. Together with the support area 22, the shaft 25 forms a hand grip. The guiding hand may grip around the shaft with the remaining fingers. An operating button 30 is provided on a front side of the shaft 25 pointing towards the tool receptacle 14, which is for activating the electric screwdriver 10, in particular the motor 12. The user may actuate the operating button 30 with the remaining fingers.

A contact surface 31 for a second hand is provided on the rear side 21 of the housing 11. The contact surface 31 is arranged on the side of the guidance plane 24 opposite from the shaft 25 and approximately in an extension of the shaft 25. The contact surface 31 runs perpendicular or at an inclination 32 between 80 degrees and 100 degrees to the working axis 17. The inclination 32 of the contact surface 31 is preferably closer to 90 degrees to the working axis 17 than the inclination 26 of the longitudinal axis 27 of the shaft 25. The height 33 of the contact surface 31, i.e., the dimension perpendicular to the guidance plane 24, preferably lies in the range between 1.2 cm and 2.0 cm.

In a section along the working axis 17 in the support area 22, the rear side 21 preferably has a recessed grip 34 whose point closest to the tool receptacle 14, measured parallel to the working axis 17, lies on the working axis 17. The user intuitively places the span between the thumb and index finger of his hand in the recessed grip 34 and initiates the force via this hand area along the working axis 17.

The support area 22 for the thumb and index finger of the guiding hand may be sunk into the housing 11 in order to facilitate holding the guiding hand in the most ergonomically favorable position. The sunken support area 22 has longish groove-shaped recesses 35 along the legs 23, which recesses are sunken-in in the direction of the working axis 17 for, for example, 0.5 cm to 1 cm. A width of the recess 35, i.e., the dimension perpendicular to the guidance plane 24, corresponds approximately to the width of a thumb.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalent thereof.

What is claimed is:

1. A hand-held power tool, comprising:

a housing;

a tool receptacle disposed at a first end of the housing and defining a working axis;

a motor coupled to the tool receptacle by a drive train;

a grip area for a first hand formed on a second end of the housing, wherein the grip area includes:

a support section for a thumb and an index finger that defines a guidance plane, wherein the working axis lies on the guidance plane, wherein the support section for the thumb and the index finger has a recessed grip on a rear side of the housing, and wherein a deepest point of the recessed grip lies on the working axis; and a shaft section on a side of the guidance plane; and a contact surface for a second hand formed on a top-most portion of the rear side of the housing and on an opposed side of the guidance plane, wherein the contact surface is inclined linearly between 80 degrees and 100 degrees to the working axis and wherein a height of the contact surface extending perpendicular to the guidance plane is at least 1.2 cm.

2. The hand-held power tool according to claim 1, wherein the support section is sunk into the housing.

3. The hand-held power tool according to claim 1, wherein the power tool is an electric screwdriver.

* * * * *